May 31, 1932. S. W. BORDEN 1,860,800
ELECTRICAL BONDING DEVICE
Filed Jan. 26, 1929

Inventor
Stephen W. Borden

Patented May 31, 1932

1,860,800

UNITED STATES PATENT OFFICE

STEPHEN W. BORDEN, OF SUMMIT, NEW JERSEY

ELECTRICAL BONDING DEVICE

Application filed January 26, 1929. Serial No. 335,369.

This invention pertains to improvements in electrical bonding fittings, used principally for the purpose of establishing an electrical connection between conduits and those portions of sheet metal switch boxes and the like through the wall of which the conduits pass; the connection being made without the use of an auxiliary jumper or connector.

I am aware that devices for this purpose have been previously manufactured, but I know of no fittings of this character wherein a full threaded connection is established with the conduit, nor wherein the fitting is combined with other fittings customarily associated with the conduit where it enters a switch box, such as a conduit bushing or a conduit locknut.

The object of my invention is to provide fittings of the character described which will provide more effective contacting surfaces than any fittings heretofore available, and also to provide fittings which are more economical to use.

My invention centers about an expandible metallic flanged collar so designed that the collar may be inserted in the space between the conduit and the wall of a switch box where the conduit passes through the wall of the box, and means for expanding said collar into intimate contact with the wall of the box; this device is useful principally as a detachable or an integral part of a conduit bushing or locknut, but it may be used by itself for the purpose of connecting on independent electrical conductor to the box.

Figure 1:
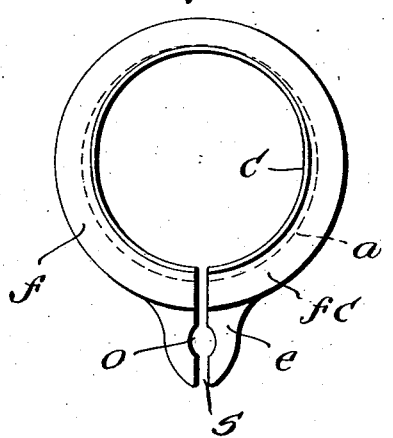

Fig. 1 is a plan view of the expandible collar in which $c$ is a relatively short, thin collar integral with the flange $f$. The ear $e$, which is also an integral part, is provided with an opening $o$ and the entire ring is cut transversely by the slot $s$. The ring is shown in a collapsed state and the dotted line $d$ represents the relative location of a box wall opening.

Figure 2:
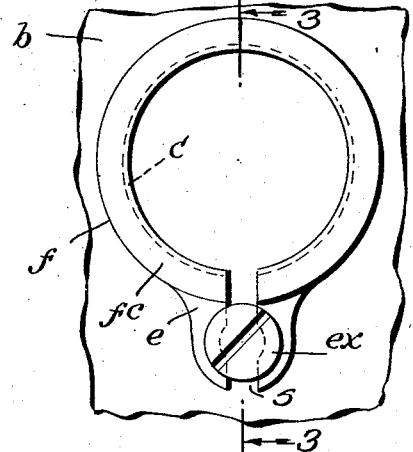

In Fig. 2, $b$ is a portion of the wall of a sheet metal box in which the fitting of Fig. 1 is inserted from the top, the view of the fitting being a plan of the reverse side from that shown in Fig. 1. The collar $c$ is expanded into tight contact with the wall of the box by means of the screw $ex$ which is screw threaded into the opening $o$.

Figure 3:
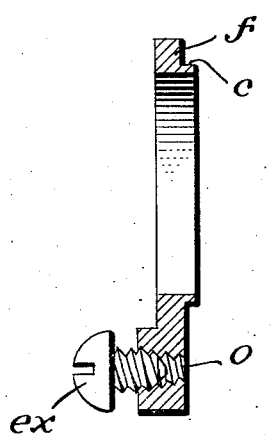

Fig. 3 is a cross section elevation on the line 3—3 of Fig. 2, with the exception of the screw $ex$ which is shown in full elevation.

Figure 4:
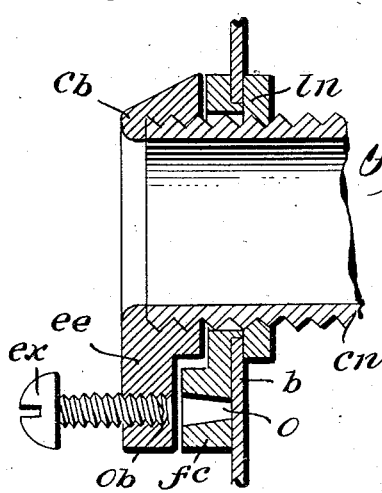

Fig. 4 is a cross section elevation of a composite fitting in which a conduit bushing is combined with my expandible flanged collar, same being mounted in a switch box together with a conduit and ordinary locknut. In this fitting the conduit bushing portion $cb$ and the flanged collar portion $fc$ are separate portions. The opening $o$ is of tapering form and not necessarily threaded. The expanding screw $ex$ serves the triple purpose of expanding the collar, creating a permanent electrical connection between the bushing portion and the collar portion of the fitting, and at the same time preventing the bushing portion from rotating on the conduit.

Figure 5:
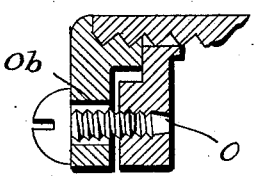

In Fig. 5 the opening $o$ in the expandible portion is threaded for at least a part of its length while the opening $ob$ in the bushing portion is unthreaded, which construction results in the two portions being drawn tightly together when the expanding screw $ex$ is set-up, whereas the construction in Fig. 4 results in the portions being forced apart. Each type of construction has advantages.

Figure 6:
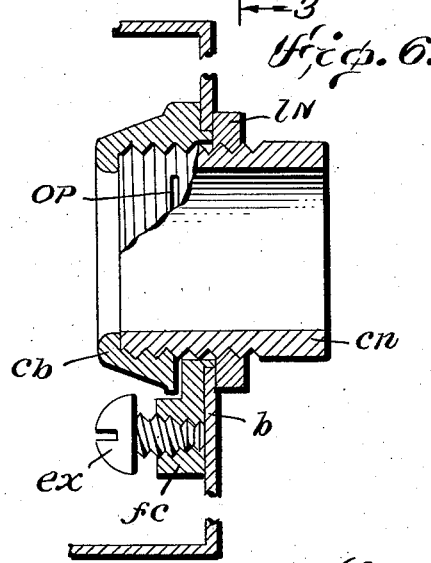

Fig. 6 is a cross section on the center line of my expandible flanged collar formed as an integral part of an electrical conduit bushing and mounted on a conduit in a sheet metal box; $cb$ is the conduit bushing portion of the fitting, $b$ the switch box and $ln$ an ordinary conduit locknut customarily used in such construction and $cn$ is the conduit; $fc$ is the expandible flanged collar portion of the fitting which is separated from the conduit bushing portion $cb$ by the opening $op$ which extends around the entire circumference of the fitting with the exception of a portion embracing approximately thirty degrees which portion is located diametrically opposite the expanding screw $ex$.

The manner of using the fittings I have described and the benefits resulting from their use is as follows:—

Referring to Fig. 6.—A threaded conduit $cn$, upon which an ordinary locknut has been placed, is inserted through the wall of the box $b$. One of my combination conduit bushing and flanged collar fittings of the integral type is then fitted on the end of the conduit as shown, after which the locknut $ln$ is screwed tight against the outside of the box, clamping the box between itself and the flange $f$ of the expandible fitting. The expanding screw $ex$ is now threaded into the opening $o$ expanding the collar $c$ in the box opening. As a result we have (1) a conduit bushing suitable for protecting from abrasion, the wires to be pulled into the conduit and (2) we have a full threaded connection between the conduit and the bushing and an excellent electrical connection between the bushing and the box via the expanded collar in the box opening, and (3) the bushing is locked against rotation on the conduit so that it cannot become loosened. As previously suggested a "BX" box connector may be substituted for the conduit $cn$ in which case the locknut $ln$ is unnecessary.

Sheet metal switch boxes are ordinarily covered with insulating paint which makes it rather difficult to secure satisfactory surface contacts therewith. The openings for the conduits are provided for by means of knockouts or twistouts which are not removed until the box is ready for use. When an opening has been formed by removing a knockout or a twistout there is left a clean, bright, metallic surface surrounding the opening and a surface which is therefore suitable for making a satisfactory surface contact. Since the collar $c$ is retained in the box opening by the flange $f$, assisted if necessary by the locknut $ln$, it obviously cannot slip out during the expanding process.

What I claim is:—

1. An electrical connecting device which includes a portion internally threaded for a conduit and having an internal shoulder overlapping the end of the conduit and which includes a second portion in the form of a flanged ring attached to the first portion at one point, the flanged ring being severed by a radial slot located substantially diametrically opposite the point of attachment between the first and second portions and means in the slot for circumferentially expanding a portion of the flanged ring in a circular opening.

2. An electrical connecting device comprising a threaded bushing for the end of an electric conduit, the bushing having an internal flange overlapping the end of the conduit and a collar integral with the bushing, a threaded screw hole in the collar, a slit in the collar extending through the screw hole and a screw in the hole for expanding a portion of the collar in a circular opening.

3. The combination of a threaded bushing for the end of an electrical conduit, the bushing having an internal shoulder overlapping the end of the conduit, with a slotted circular flanged ring, the flange having a radially projecting portion in which is located a circular opening and having also a radial slot passing through the flange from the inside to the outside and through the projecting portion and its circular opening and means located in the opening in the flange slot for circumferentially expanding the flange and ring.

4. An electrical connecting device in which one portion consists of a flanged ring, the ring being located within an opening in a wall of a metal enclosure, the flange being provided with a screw in a screw hole for expanding the collar circumferentially in the opening and formed with a radial slot extending through the screw hole and a member with a threaded conduit receiving opening integrally connected to the first portion.

5. An electrical connecting device which includes an internally threaded portion for threading on a conduit and a second portion integrally connected to the first portion, the second portion consisting of a circular flanged ring, the flange being formed with a radially projecting portion, readily split and containing a threaded screw hole and means located in the screw hole and acting on the flange for expanding the ring circumferentially in an opening.

In testimony whereof I have signed my name to this specification.

STEPHEN W. BORDEN.